US009766836B2

(12) United States Patent
Hasegawa et al.

(10) Patent No.: US 9,766,836 B2
(45) Date of Patent: *Sep. 19, 2017

(54) MIGRATION OF DATA TO SEQUENTIAL ACCESS MEDIUM

(71) Applicant: International Business Machines Corporation, Armonk, NY (US)

(72) Inventors: Tohru Hasegawa, Tokyo (JP); Masayuki Iwanaga, Urayasu (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/296,075

(22) Filed: Oct. 18, 2016

(65) Prior Publication Data

US 2017/0131942 A1    May 11, 2017

Related U.S. Application Data

(63) Continuation of application No. 15/059,334, filed on Mar. 3, 2016, now Pat. No. 9,513,836, which is a
(Continued)

(51) Int. Cl.
*G06F 12/00* (2006.01)
*G06F 13/00* (2006.01)
(Continued)

(52) U.S. Cl.
CPC ............ *G06F 3/0647* (2013.01); *G06F 3/061* (2013.01); *G06F 3/067* (2013.01); *G06F 3/0643* (2013.01);
(Continued)

(58) Field of Classification Search
CPC ...... G06F 12/00; G06F 12/0223; G06F 12/08; G06F 12/122
(Continued)

(56) References Cited

U.S. PATENT DOCUMENTS 7,165,059 B1    1/2007  Shah et al.
8,055,864 B2   11/2011  Sawdon et al.
(Continued)

FOREIGN PATENT DOCUMENTS

EP         1215590 A2    6/2002

OTHER PUBLICATIONS

Disclosed Anonymously, "A Filesystem for Linear Tape with Overwrite Segments", IP.com Prior Art Database Technical Disclosure, IP.com No. 000216618, Publication Date: Apr. 10, 2012, pp. 1-9.
(Continued)

*Primary Examiner* — Charles Rones
*Assistant Examiner* — Sidney Li
(74) *Attorney, Agent, or Firm* — L. Jeffrey Kelly

(57) ABSTRACT

A computer system for migrating data in a computer storage system. Data is selected to migrate from a first storage to the second storage, wherein selected files are in a resident state. Metadata is obtaining and subsets of data are ordered based on the obtained metadata, the order of the subsets of data following an expectation of update value. The subsets of data are transferring to the second storage based on the order of the subsets of data based on a predetermined schedule. Data determined as inactive is overwritten on the sequential access medium by transferred data. End data to the sequential access medium is set after a last active data is written before the one or more sets of data are determined to be inactive. The one or more sets of data determined to be inactive are deleted from the second storage and a transfer is initiated.

1 Claim, 7 Drawing Sheets

Related U.S. Application Data continuation of application No. 14/935,612, filed on Nov. 9, 2015.

(51) Int. Cl.

| | | |
|---|---|---|
| *G06F 13/28* | (2006.01) | |
| *G06F 3/06* | (2006.01) | |
| *G06F 12/122* | (2016.01) | |
| *G06F 12/08* | (2016.01) | |
| *G06F 12/02* | (2006.01) | |

(52) U.S. Cl.
CPC ............ *G06F 3/0644* (2013.01); *G06F 12/00* (2013.01); *G06F 12/0223* (2013.01); *G06F 12/08* (2013.01); *G06F 12/122* (2013.01); *G06F 2212/213* (2013.01)

(58) Field of Classification Search
USPC .................................................. 711/111, 117
See application file for complete search history.

(56) References Cited

U.S. PATENT DOCUMENTS

| | | |
|---|---|---|
| 8,205,041 B2 | 6/2012 | Otsuka |
| 9,063,666 B2 | 6/2015 | Amir et al. |
| 2002/0147881 A1 | 10/2002 | Pudipeddi et al. |
| 2002/0156968 A1 | 10/2002 | Haustein |
| 2006/0101084 A1 | 5/2006 | Kishi et al. |
| 2011/0191523 A1 | 8/2011 | Caulkins |

OTHER PUBLICATIONS

IBM: List of IBM Patents or Patent Applications Treated as Related (Appendix P), Nov. 16, 2016, pp. 1-2.

Hasegawa et al., Pending U.S. Appl. No. 14/935,612, filed Nov. 9, 2015, titled "Migration of Data to Sequential Access Medium," pp. 1-44.

Hasegawa et al., Pending U.S. Appl. No. 15/059,334, filed Mar. 3, 2016, titled "Migration of Data to Sequential Access Medium," pp. 1-39.

Hasegawa et al., Pending U.S. Appl. No. 15/296,073, filed Oct. 18, 2016, titled "Migration of Data to Sequential Access Medium," pp. 1-39.

MIGRATION OF DATA TO SEQUENTIAL ACCESS MEDIUM

BACKGROUND

The present invention, generally, relates to storage systems, more particularly, to migration of data to a sequential access medium in a storage system.

A linear tape file system (LTFS) is software that allows for the performance of standard file operations to a tape medium through a file system interface. Technical development of LTFS format specification is now continued in SNIA (Storage Networking Industry Association) TWG (Technical Work Group). Several implementations of LTFS have been developed for tape drives and tape libraries. Hierarchical storage systems integrating a primary storage tier with LTFS as a secondary storage tier have been also developed, in which part of files in the primary storage tier is stored on tape media in the LTFS format.

Since the tape medium does not allow random access due to its sequential nature, newly created data is always appended to the tape medium. Data deletions just erase pointers to the data. Data updates always append updated data to the tape medium and just modify the pointers so as to point the updated data. So, space on the tape medium that is occupied by deleted or updated obsolete data may suppress capacity of the tape medium. In the hierarchical storage systems, there is provided a process referred as a "migration", in which files are moved from the primary storage tier to the tape media in the secondary storage tier. The migration process can be scheduled at specific time, for example, off-peak hours. However, such migration process may deteriorate utilization of the tape medium due to the obsolete data on the tape medium.

SUMMARY

It would be advantageous to have a system for migrating data to a sequential access medium in a storage system, capable of improving utilization of the sequential access medium. According to an embodiment of the present invention, there is provided a method for migrating data in a storage system by a computer system, in which the storage system includes a first storage and a second storage having a sequential access medium. The method comprises determining that the second storage comprises an index partition and a data partition and selecting a plurality of data to migrate from the first storage to the second storage, wherein selected files are in a resident state. Metadata associated with one or more subsets of data of the plurality of data is obtained. Subsets of data based on the obtained metadata are ordered, the order of the subsets of data following an expectation of update value. The subsets of data are transferred to the second storage based on the order of the subsets of data based on a predetermined schedule. It is determined that the plurality of data written in a rear region of the sequential access medium is inactive and the data determined as inactive is overwritten on the sequential access medium by transferred data. The one or more sets of data written in the rear region are determined to be inactive and an end data to the sequential access medium is set after a last active data is written before the one or more sets of data are determined to be inactive. The one or more sets of data determined to be inactive are deleted from the second storage, and a transfer to the sequential access medium after the setting is initiated.

DETAILED DESCRIPTION

Now, the present invention will be described using particular embodiments, and the embodiments described hereafter are understood to be only referred as examples and are not intended to limit the scope of the present invention.

One or more embodiments according to the present invention are directed to methods, computer systems and computer program products for migrating data to a sequential access medium in a storage system.

Now referring to the series of FIGS. 1-5, FIGS. 1-5 illustrate a hierarchical storage system with disk and tape tiers, and a method for migrating files to the tape medium in the hierarchical storage system according to an exemplary embodiment of the present invention. First, referring to FIGS. 1-3, fundamental configurations of the hierarchical storage system will be described.

Figure 1:
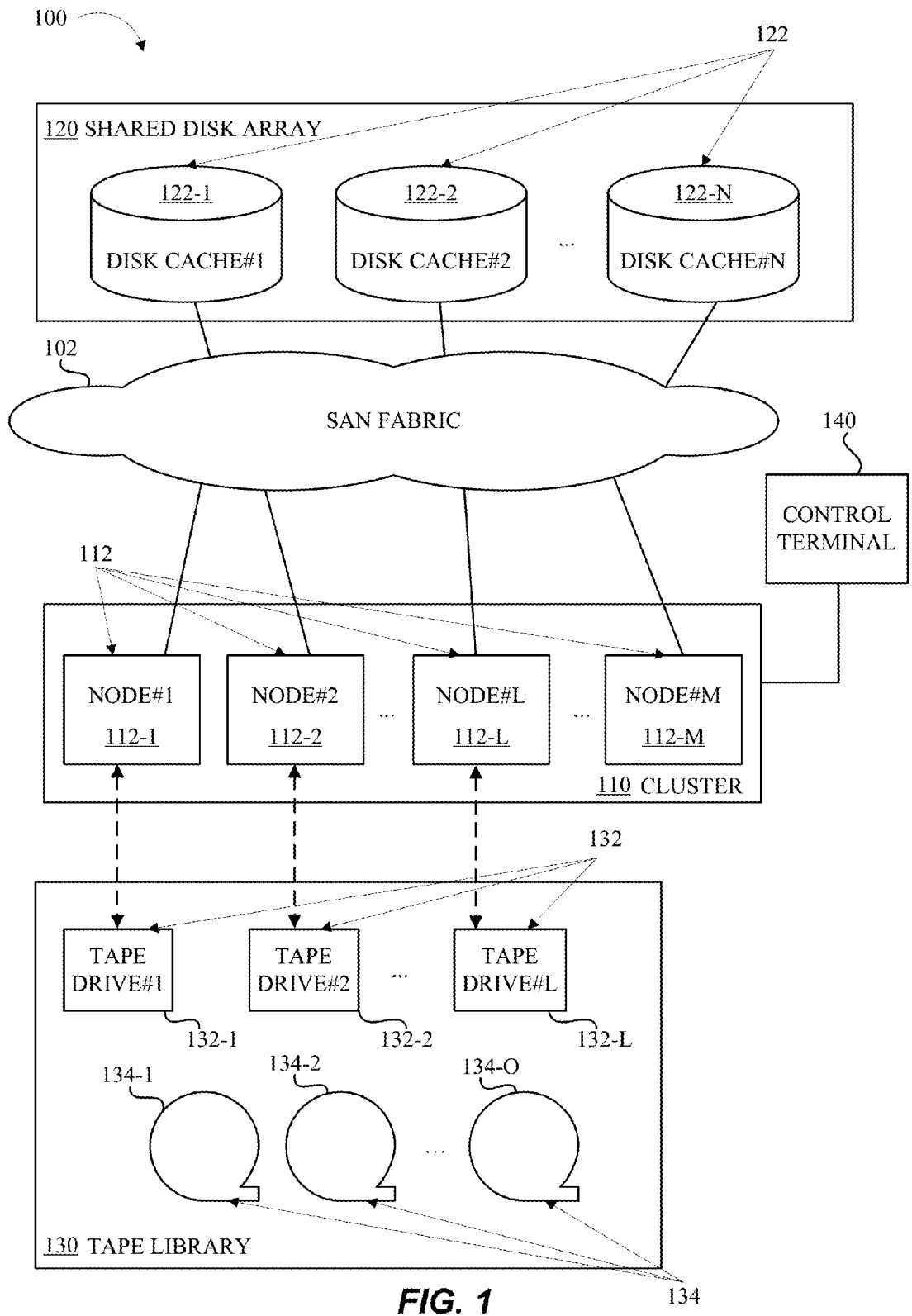
FIG. 1 is a functional block diagram of illustrating a hierarchical storage system, according to an embodiment of the present invention.

FIG. 1 is an overview of a hierarchical storage system according to an exemplary embodiment of the present invention. The hierarchical storage system 100 includes a cluster 110, a shared disk array 120, and a tape library 130, and a control terminal 140 all interconnection via SAN fabric 102. The cluster 110 includes one or more of node 112-1, node 112-2, node 112-L, and node 112-M. Node 112-1, node 112-2, node 112-L, and node 112-M may be generally referred to as nodes 112, as seen in FIG. 1. The cluster 110 provides a file system that allows for performing file operations to the hierarchical storage system 100.

The hierarchical storage system 100 may include a shared disk array 120 that includes one or more disk cache 122-1, disk cache 122-2, and disk cache 122-N, as a primary storage tier. Disk cache 122-1, disk cache 122-2, and disk cache 122-N may be referred to generally as disk caches 122 as seen in FIG. 1. The shared disk array 120 may be referred simply as the shared disk array 120. Each of nodes 112 in the cluster 110 may be connected to the disk caches 122 in the shared disk array 120 via a SAN (Storage Area Network) fabric 102. The SAN fabric may include, but not limited to, FC (Fibre Channel), SAN based on a fiber channel network and/or IP (Internet Protocol), or SAN based on TCP (Transmission Control Protocol)/IP network with LAN (Local Area Network) switches.

The nodes 112 may share the disk caches 122. The nodes 112 can access the disk caches 122 via the SAN fabric 102 and may provide indirect file access to other nodes 112 that do not connect to the SAN fabric 102. A file system distributed over the one or more nodes 112 in the cluster 110, to which plurality of nodes (may include client nodes) can access, can be referred to as a clustered file system or a distributed parallel file system. The clustered file system may provide a global namespace, a striping functionality to stripe input and output over the nodes and an information lifecycle management (ILM) functionality.

The hierarchical storage system 100 may include a tape library 130 as a secondary storage tier. The tape library 130 may be referred simply as the tape tier. The tape library 130 includes one or more tape drives. Tape library 130 includes tape drive 132-1, tape drive 132-2, and tape drive 132-L, which may be referred to generally as tape drives 132. Tape library 130 also includes tape medium 134-1, tape medium 134-2, and 134-O, which may be referred to generally as tape media 134. Any of the tape media 134 may correspond to a sequential access medium to be a target of migration in the describing embodiment. Each of the nodes 112 in the cluster 110 may be connected to the tape library 130 via SAN fabric, FC LVD (Low Voltage Differential) SCSI (Small Computer System Interface) or SAS (Serial Attached SCSI) cables. The tape library 130 may include a plurality of tape drives 132 to enable the plurality of the nodes 112 to access a set of the tape media 134 simultaneously. The tape drives 132 may be occupied by one or more of nodes 112 at a point in time and may be used alternately. The tape drives 132 accept preferably LTO (Linear Tape-Open) Ultrium 5 or later tape cartridges, which support LTFS.

In various embodiments, the tape library 130 may be managed by a tape file system such as LTFS (Liner Tape File System) and integrated to the clustered file system so that at least part of data in the shared disk array 120 is stored on tape media 134 in the tape library 130. Files may migrate from the shared disk array 120 to the tape library 130 based on a predetermined migration policy.

The hierarchical storage system 100 may include further a control terminal 140. The control terminal 140 is a terminal device which an administrative user can operate, in order to issue manual request and specify settings of the hierarchical storage system. Using the control terminal 140, the administrative user can specify and edit the migration policy for the migration process according to the exemplary embodiment of the present invention, which will be described in more detail below. The administrative user may issue a manual request and specify schedules or policies for other functionalities of the hierarchical storage system 100, such as standard migration, recall, reclamation, reconciliation, file placement, file management, etc.

In various embodiments, the hierarchical storage system 100 is integrated with LTFS systems and applications that are adapted for accessing hard disk drives may be used directly without modifying the application. Since the system accesses files first on the shared disk array 120 instead of directly accessing files on the tape media 134, time-out to access a file may be avoided.

In various embodiments, the nodes 112-1-112-M are described to be connected to the disk caches 122-1-122-N in the shared disk array 120 and the nodes 112-1-112-L are described to be connected to the tape drives 132-1-132-L in the tape library 130. It should be appreciated that the configuration of the hierarchical storage system 100 described above in reference to FIG. 1 is only exemplary of a typical storage system and is not intended to suggest any limitation.

In an embodiment, the shared disk array may be divided into one or more online storage tiers and one or more near line storage tiers to construct a three or more tiered architecture. In another embodiment, the hierarchical storage system may include further a flash storage tier on top of the disk tier or in place of the disk tier. In an additional embodiment, the storage system may have merely one node, one disk cache and one tape drive to construct a hierarchical storage system. In an additional embodiment, another type of a sequential access medium may be used as a target of the migration in place of or in addition to the tape medium.

Figure 2:
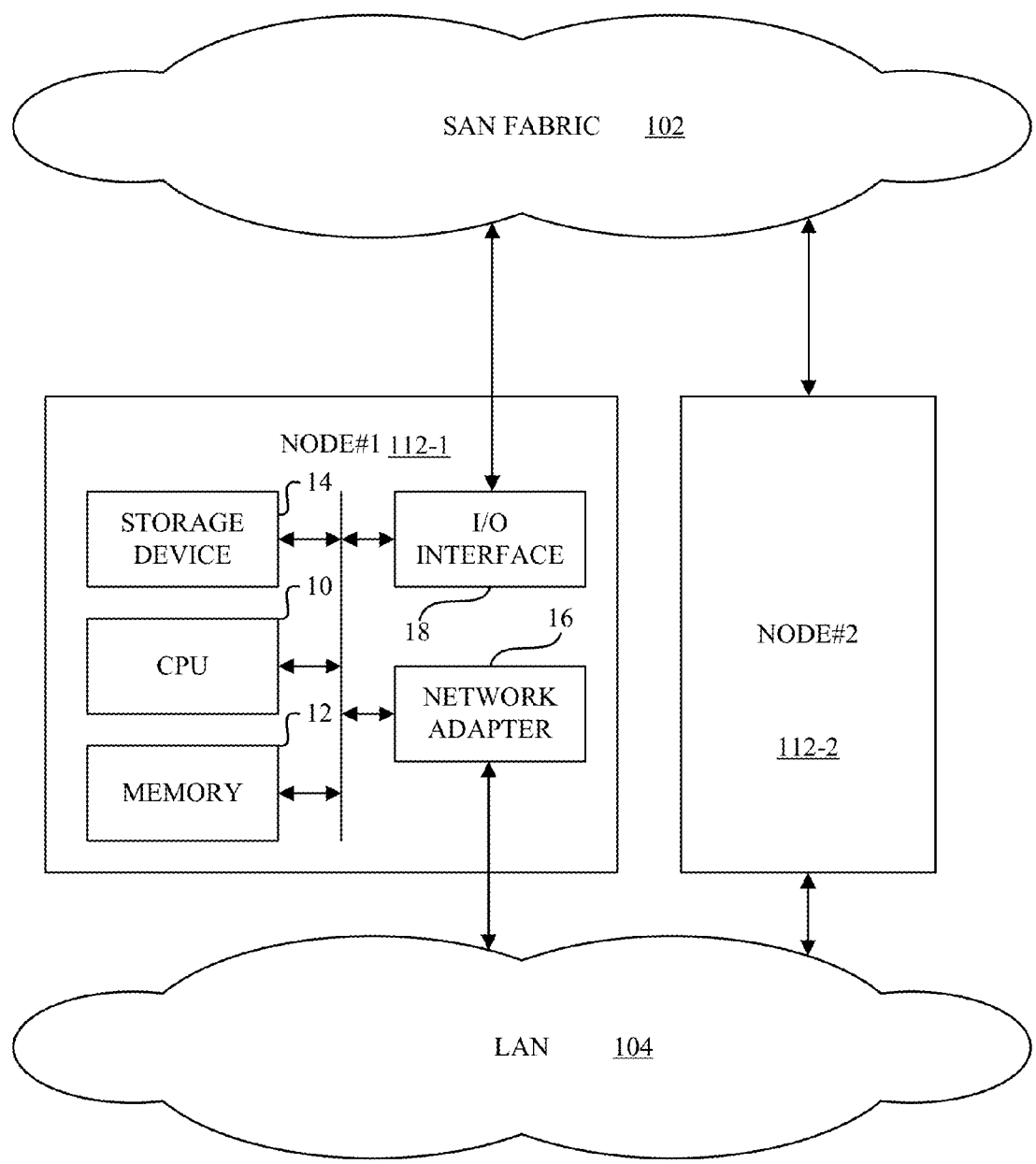
FIG. 2 is a functional block diagram of illustrating a node constituting a cluster of the hierarchical storage system, according to the an embodiment of the present invention.

Referring to FIG. 2, FIG. 2 is a schematic of an example of a node according to an embodiment of the present invention. The nodes 112 are only one example of suitable nodes and are not intended to suggest any limitation as to the scope of use or functionality of embodiments of the invention described herein. The nodes 112 are capable of being implemented and/or performing any of the functionality set forth herein.

The nodes 112 are operational with numerous other general purpose or special purpose computing system environments or configurations. Examples of well-known computing systems, environments, and/or configurations that may be suitable for use with the nodes 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems, or devices.

The nodes 112 may be described in the general context of computer system-executable instructions, such as program modules, being executed by a computer system. Generally, program modules may include routines, programs, objects, components, logic, data structures, and so on that perform particular tasks or implement particular abstract data types.

Referring to FIG. 2, the nodes 112 are shown in the form of a general-purpose computing devices. The components of the nodes 112 are discussed in more detail in reference to FIG. 6, and may include, but are not limited to, one or more processors (or processing units) 10 a memory 12, storage device 14, network adapter 16, and interface 18, operatively coupled to the processors by a bus including a memory bus or memory controller, and a processor or local bus using any of a variety of bus architectures.

The nodes 112 typically include a variety of computer system readable media. Such media may be any available media that is accessible by the nodes 112, and include both volatile and non-volatile media, removable and non-removable media.

Referring to FIG. 2, the memory 12 can include computer system readable media in the form of volatile memory, such as random access memory (RAM) 604. The nodes 112 may further include other removable/non-removable, volatile/non-volatile computer system storage media. By way of example only, the storage device 14 can be provided for reading from and writing to a non-removable, non-volatile magnetic media. A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other portable computer readable storage media can be provided. In such instances, each can be connected to bus by one or more data media interfaces. As will be further depicted and described below, the storage device 14 may include at least one program product having a set (e.g., at least one) of program modules that are configured to carry out the functions of embodiments of the invention.

Programs may be stored in the storage device 14 by way of example, and not limitation, as well as an operating system, one or more additional application programs, other program modules, and program data. Each of the operating system, one or more additional application programs, other program modules, and program data or some combination thereof, may include an implementation of a networking environment. Program modules generally carry out the functions and/or methodologies of embodiments of the invention as described herein.

The nodes 112 may also communicate with one or more peripherals such as a keyboard, a pointing device, a display, or one or more devices that enable a user to interact with the nodes 112; and/or any devices that enable the nodes 112 to communicate with one or more other computing devices via SAN fabric 102. Such communication can occur via Input/Output (I/O) interfaces 18. Still yet, the node 112 can communicate with one or more networks such as a local area network (LAN) 104, a general wide area network (WAN), and/or a public network (e.g., the Internet) via the network adapter 16. As depicted, the network adapter 16 communicates with the other components of the node 112 via bus. It should be understood that although not shown, other hardware and/or software components could be used in conjunction with the node 112. Examples, include, but are not limited to: microcode, device drivers, redundant processing units, external disk drive arrays, RAID systems, tape drives, and data archival storage systems, etc. The nodes 112 may be interconnected with other node via a host channel adapter (HCA) such as InfiniBand™.

LAN 104 may include permanent connections, such as wire or fiber optic cables, or temporary connections made through telephone or wireless communications. LAN 104 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. LAN 104 may also include a number of different types of networks, such as, for example, an intranet, a local area network (LAN), or a wide area network (WAN).

Hardware and/or software components of the tape library 130, the tape drives 132, and the control terminal 140 may include, similar to the nodes 112 shown in FIG. 2, a processer, a memory, a read only memory, a network adapter, and a I/O interface, but not be shown in the drawings any more.

Figure 3:
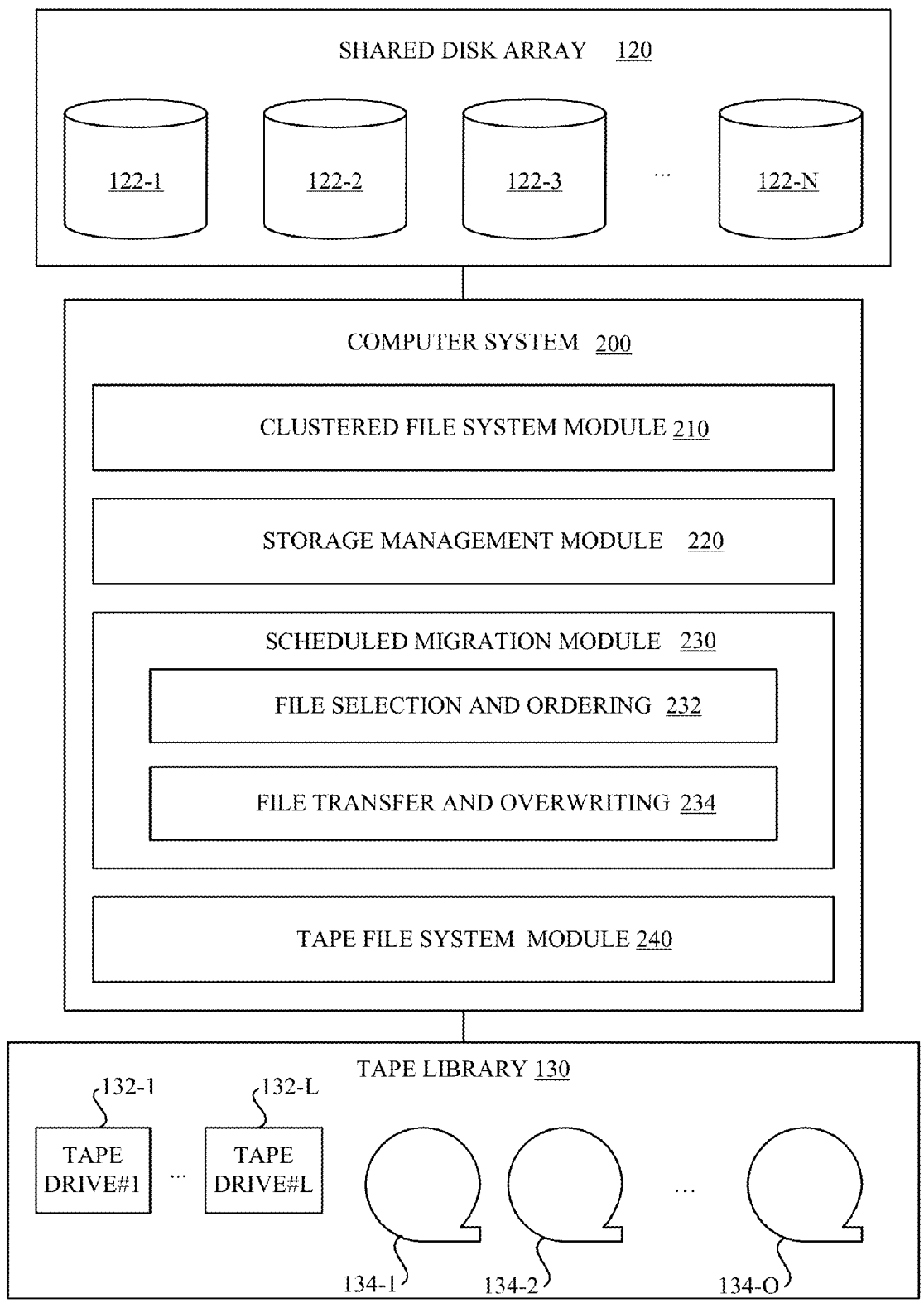
FIG. 3 is a functional block diagram of illustrating a hierarchical storage system, according to the exemplary embodiment of the present invention.

Referring to FIG. 3, FIG. 3 is a block diagram of the hierarchical storage system 100, according to an embodiment of the present invention. The hierarchical storage system 100 includes a computer system 200 connected to the shared disk array 120 and the tape library 130. The computer system 200 may be composed of the nodes 112 shown in FIGS. 1 and 2.

The computer system 200 may include a clustered file system module 210, a storage management module 220, a scheduled migration module 230, and a tape file system module 240. The clustered file system module 210 may be a software component that manages the clustered file system (corresponding to the shared disk array 120) in the hierarchical storage system 100.

The storage management module 220 may be a software component that provides integration of the clustered file system managed by the clustered file system module 210 with the tape file system managed by the tape file system module 240. The storage management module 220 manages standard migration and recall activities in the hierarchical storage system 100.

The tape file system module 240 may be a software component that allows for performing file operations to the tape media and providing interface to manipulate files on the tape media in the tape library 130. The tape file system module 240 accesses recording space on the tape media through their file system interface and handles data as file objects and associated metadata. The tape library 130 may be mounted entirely as a file system, and the tape media 134 in the tape library 130 may be accessed as subdirectories under a mount point of the tape library 130.

In various embodiments of the invention, migration, recall, and reconciliation in the hierarchical storage may be utilized by the system. Migration is a process in which files are moved from the shared disk array 120 to the tape media 134 on the tape library 130. The migration process may have plurality of modes. In a first mode, the migration process leaves behind a small stub file on the shared disk array 120, which points the file body migrated to the tape medium. The migration process in a second mode is so-called as a pre-migration, in which files are moved from the shared disk array 120 to the tape media 134 on the tape library 130 without replacing the file body with a stub file on the shared disk array 120. According to the pre-migration, identical copies of the files are on both the disk and tape tiers. Recall is a process in which the migrated files are moved from the tape media back to the originating disk tier if an accessed file does not exist on the shared disk array 120.

The files newly created or overwritten to the hierarchical storage system 100 may initially be merely on the shared disk array 120, thus the file state is initially "resident". The files may be migrated from the shared disk array 120 to the tape library 130 by migration process, after which the file is a stub on the disk and the identifiers of the tapes storing the copies are written to metadata. The file state of such file is referred as "migrated". The file may be recalled from the tape library 130 by recall activities when an application attempts to read from the file. The file state of such file on both the disk and tape tiers is referred as "pre-migrated". Also the files may be pre-migrated to the tape library 130 by running the migration process in second mode.

In the hierarchical storage system according to a particular embodiment, deletions or updates of file just delete or update the file on the shared disk array 120, and such operations may not be reflected to the tape media 134 on the tape library 130. Thus, obsolete data that is deleted or updated may still remain on the tape media. Reconciliation is a process in which the shared disk array 120 is synchronized with contents of the tape media 134 and old and obsolete data are deleted from the tape media 134. These obsolete objects can be identified as inactive after the reconciliation process. However, note that the inactive objects still occupy recording space on the tape media 134. The reconciliation process may be executed when files in the d shared disk array 120 are deleted, moved, or renamed.

The migration process can be triggered by using predetermined migration policy. The migration policy may include thresholds for utilization of the tape medium to start the migration process and/or to end the migration process. For examples, a policy may start the migration process when a specific pool reaches 80% capacity and continues migration until the pool is reduced to 60% capacity or less. The migration policy also can include a timing condition in which the migration process is scheduled at specific time such as off-peak hours.

However, such migration process may deteriorate the utilization of the tape medium due to following reason: Even though recently created or updated fresh files empirically tend to be updated again, however, the process migrates all files regardless of whether the file is fresh or not. The files that are migrated just after being created or updated likely become inactive. Such recording space occupied by inactive files may suppress capacity of the tape medium. Nonetheless, the amount of such inactive files on the tape medium tends to increase as the migration processes repeated. So, there is room for improvement in the migration process to the tape medium.

Therefore, it may be advantageous to have a computer systems or computer program products for migrating data to a tape medium in the hierarchical storage system, capable of improving utilization of the tape medium. In various embodiments of the present invention, a migration function may be incorporated into the hierarchical storage system 100. A process of the migration function may be triggered in response to determining that a predetermined timing condition is met. During the migration process, the computer system 200 selects a plurality of files to migrate from the shared disk array 120 to the tape library 130. The computer system 200 obtains metadata information of each file and orders the plurality of the files based on the obtained metadata information. The metadata information may suggest the expectation of a corresponding file to be updated. Thus, the order of the files can follow the expectation of the update of the files. The computer system 200 transfers the plurality of the files to the tape library 130 based on the order of the files.

Before substantial transfer for each tape medium occurs, the computer system 200 determines whether data written in a rear region of the tape medium (around end of data (EOD)) is active or inactive. If the data is determined to be inactive, the computer system 200 overwrites the data in the rear region by migrated data.

In various embodiments of the present invention, the order of the files migrated to the tape library 130 may be determined based on the metadata information of the files. The files that are expected to become inactive before next migration process on the basis of the metadata information may be concentrated around end of the tape media 134. The file that has become inactive after the previous migration process may be overwritten by migrated data and a space occupied by the inactive data may be reused during a next migration process, and may improve the efficacy of tape medium utilization. The utilization may be measured as a percentage or ratio of valid capacity for the valid files to the total tape capacity of the tape medium.

In an exemplary embodiment, the computer system 200 includes further a scheduled migration module 230. Hereinafter, the migration function according to the exemplary embodiment of the present invention will be described in detail with referring FIGS. 3, 4, and 5.

The scheduled migration module 230 may be a software component that provides the migration function according to the exemplary embodiment of the present invention. The scheduled migration module 230 is configured to perform the migration process in response to satisfying the predetermined timing condition. As shown in FIG. 3, the scheduled migration module 230 may include a file selection and ordering sub-module 232 and a file transfer and overwriting sub-module 234.

In an embodiment of the invention, the file selection and ordering sub-module 232 is configured to select a plurality of files to be migrated and obtain metadata information of each selected file. The file selection and ordering sub-module 232 is further configured to perform ordering of the selected files based on the metadata information. In a preferable embodiment, the plurality of the selected files may be ordered such that the order gets lower (i.e. migrates later) as the expectation of the update increases. The expectation of the update of the file can be measured by the metadata information, which includes a timestamp, a name, an extension, size or combination thereof.

For example, recently created or updated files may be updated again, since such file can be a document in progress. Files with a specific string such as "log" or files with an extension that is used for log files such as ".log" also empirically tend to be updated again, since such log file may be update frequently or regularly. Files having smaller size expected to be updated more frequently than the files having larger size.

The file transfer and overwriting sub-module 234 is configured to transfer the ordered files from the shared disk array 120 to the tape library 130 based on the order of the files. The file transfer and overwriting sub-module 234 is further configured to determine whether data written in a rear region of the tape media 134 is inactive before starting a substantial transfer processing for the tape media 134. The file transfer and overwriting sub-module 234 is further configured to overwrite the data on the tape media 134 by transferred data during the migration process if the data is determined to be inactive.

To overwrite the inactive data on the tape media 134, the file transfer and overwriting sub-module 234 sets end of data (EOD) to the tape media 134 after last active data on the tape medium 134 and initiates transfer to the tape media 134 after the EOD is set.

In various embodiments, the hierarchical storage system 100 includes one or more modules to provide various features and functions. These modules may be implemented in hardware, software or firmware executable on hardware, or a combination thereof. Also, these modules are presented only by way of example and are not intended to suggest any limitation. Alternative embodiments may include additional or fewer modules than those illustrated in FIG. 3, or the modules may be organized differently. Furthermore, it should be appreciated that, in some embodiments, the functionality of some modules may be broken into multiple modules or, conversely, the functionality of several modules may be combined into a single or fewer modules.

Figure 4A:
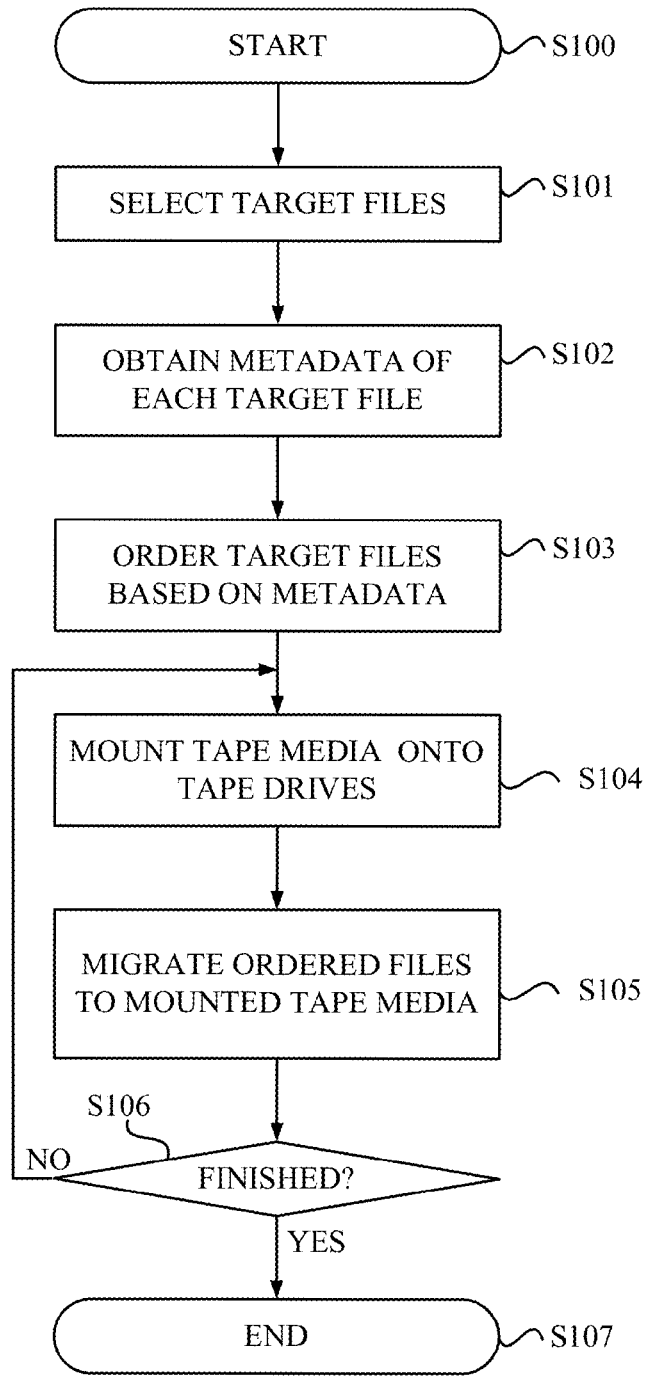
FIG. 4A and FIG. 4B are flowcharts depicting a migration process with overwriting inactive data around tail end of a tape medium according to an embodiment of the present invention.
Figure 4B:
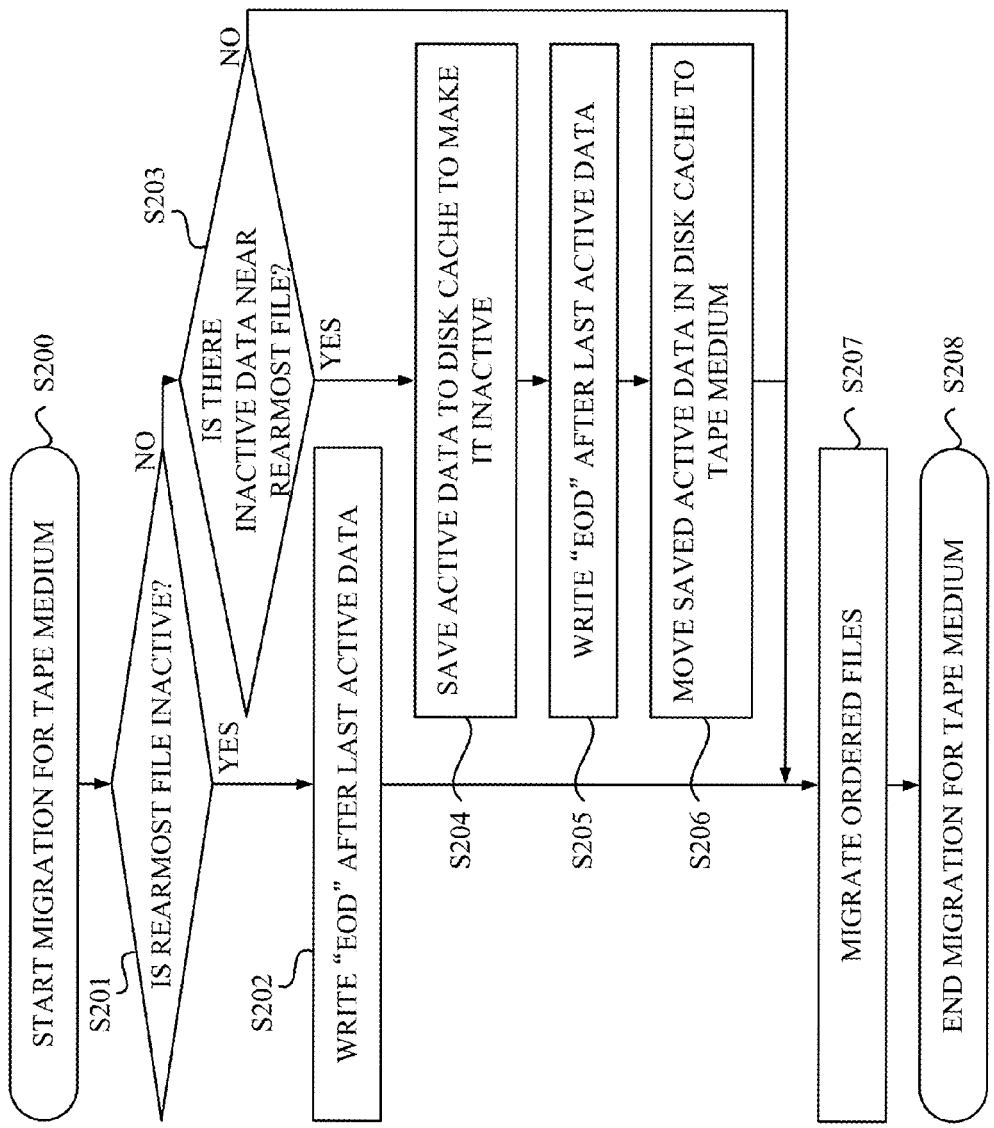

In reference to FIGS. 4 and 5, the migration process with overwriting inactive data around tail end of the tape medium is illustrated. FIG. 4A is a flowchart of a main routine of the migration process and FIG. 4B is a flowchart of a subroutine for each tape medium. FIG. 5 illustrates the migration process with overwriting inactive data around tail end of the tape medium. Note the tail end of the tape medium can be defined by end of data (EOD) of the tape media 134 in LTFS format.

In reference to FIG. 4A, process begins at step S100. Note that the process shown in FIG. 4A may be performed by the nodes 112 allocated to manage the migration process in response to satisfying the predetermined timing condition. The destination of the migration may be specified as a pool of the tape media 134 in the tape library 130 or a single tape media 134. The tape drives 132 to be used for the migration or the number of the tape drives 132 to be used for the migration may be specified from among currently available tape drives 132.

At step S101, the nodes 112 select a plurality of files to migrate from the shared disk array 120 to the tape library 130 by the file selection and ordering sub-module 232. In a particular embodiment, files with a "resident" state may be selected as targets of the migration. At step S102, the nodes 112 obtain metadata information of each selected file, such as node information in the clustered file system, by the file selection and ordering sub-module 232. At step S103, the nodes 112 order the selected files based on the metadata information by the file selection and ordering sub-module 232. A set of target files, F={f1, . . . , fn}, is prepared, in which the target files fi (i=1, . . . , n; n is the number of files selected) are sorted based on the metadata information.

In an embodiment, the metadata information may be a timestamp on update and the target files may be sorted in an ascending order starting from the least recently updated file, for example. In various embodiments, the metadata information may be the name, the extension, or the size, in place of or in addition to the timestamp.

At step S104, the nodes 112 control to mount each tape medium from among the specified pool onto each tape drive 132. To minimize the total time required for the migration, the system may mount tape media 134 on all available tape drives 132 in the system 100 to migrate multiple files in parallel.

Migration using the plurality of the tape drives 132 makes it possible to shorten the time required for the migration. Following advantages may be achieved in terms of user's operations: When the migration is scheduled at the time specified by the user such as night or any other period of time during which the primary shared disk array 120 is not used, occurrence of a case where the migration fails to be completed until desired timing such as morning can be preferably prevented.

At step 105, the nodes 112 migrate the ordered files, fi (i=1, . . . , n) to the mounted tape media 134 based on the order of the selected files by file transfer and overwriting sub-module 234. In a particular embodiment, the ordered files, fi (i=1, . . . , n) may be migrated in an ascending order starting from the least recently updated file.

At step S106, the nodes 112 determine whether the migration process is completed. For example, when all selected files are migrated to the tape library 130, the nodes 112 determine that the migration process is finished. If the nodes 112 determine that the migration process is not finished, in step S106 "NO" branch, then the process loops back to step S104 so as to mount other remaining tape media onto the tape drives. If the nodes 112 determine that the migration process is finished, in step S106 "YES" branch, then the process proceeds to step S107 and ends at step S107. In this manner, the files with a recent update timestamp are arranged in a rear region of last tape media.

Referring to FIG. 4B, the subroutine begins at step S200 by initiating the migration processing for each tape medium at the step S105 shown in FIG. 4A. Note that the process shown in FIG. 4B may be performed by the nodes 112 allocated to handle the substantial migration processing for the particular tape medium.

At step S201, the nodes 112 determine whether a rearmost file on the tape media 134 is inactive. In accordance with the LTFS specification, a tape medium that includes an index partition and a data partition is required. The index partition contains index data such as information associated with allocation of files. The data partition contains all of content data and the index data. When the file is deleted from the tape medium, the system erases pointers to corresponding content data in the index data. Thus, the nodes 112 can determine whether the file on the tape medium is inactive or not by referring the index data of the tape medium.

In the hierarchical storage system according to an embodiment, the tape file system module 240 is not notified upon moves, renames, or deletions of files in the shared disk array 120. Therefore, the metadata of the migrated files on the shared disk array 120 may diverge from their equivalents on tape library 130. The reconciliation process is provided to synchronize the shared disk array 120 with the tape media and to delete old and obsolete data from the tape medium. Therefore, the reconciliation process can be performed before the migration process so that these obsolete objects are deleted from the tape medium and identified as inactive.

However, this is only an example of ways for identifying inactive data in the hierarchical storage system 100, and is not intended to suggest any limitation. In various embodiments, the tape file system module 240 may be notified from the clustered file system module 210 so as to reflect operations, which are issued to the shared disk array 120, into the tape media 134 on the tape library 130 in real time. The index data is read from the index partition of the tape media 134 to the disk caches 122 or memory device at the time of mounting of the tape media 134. Therefore, the system can flag on the index data in the disk caches 122 or the memory device such that the obsolete objects can be identified as inactive in real time and deleted from the tape media 134 at the time of mounting of the tape media 134. Note that the inactive objects still occupy recording space on the tape medium.

If the nodes 112 determines that the rearmost file is inactive in decision step S201 "YES" branch, the process branches to step S202. At step S202, the nodes 112 writes end of data (EOD) just after a last active file and the process proceeds directly to step S207. At step S207, the nodes 112 starts to migrate the files to the tape media 134, and ends at step S208.

Figure 5A:
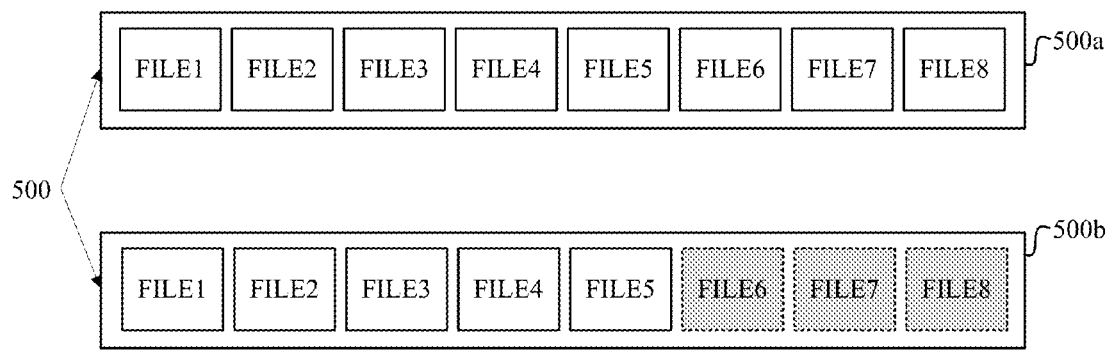
FIG. 5A and FIG. 5B illustrate schematically the migration process with overwriting inactive data around tail end of the tape medium, according to an embodiment of the present invention.
Figure 5B:
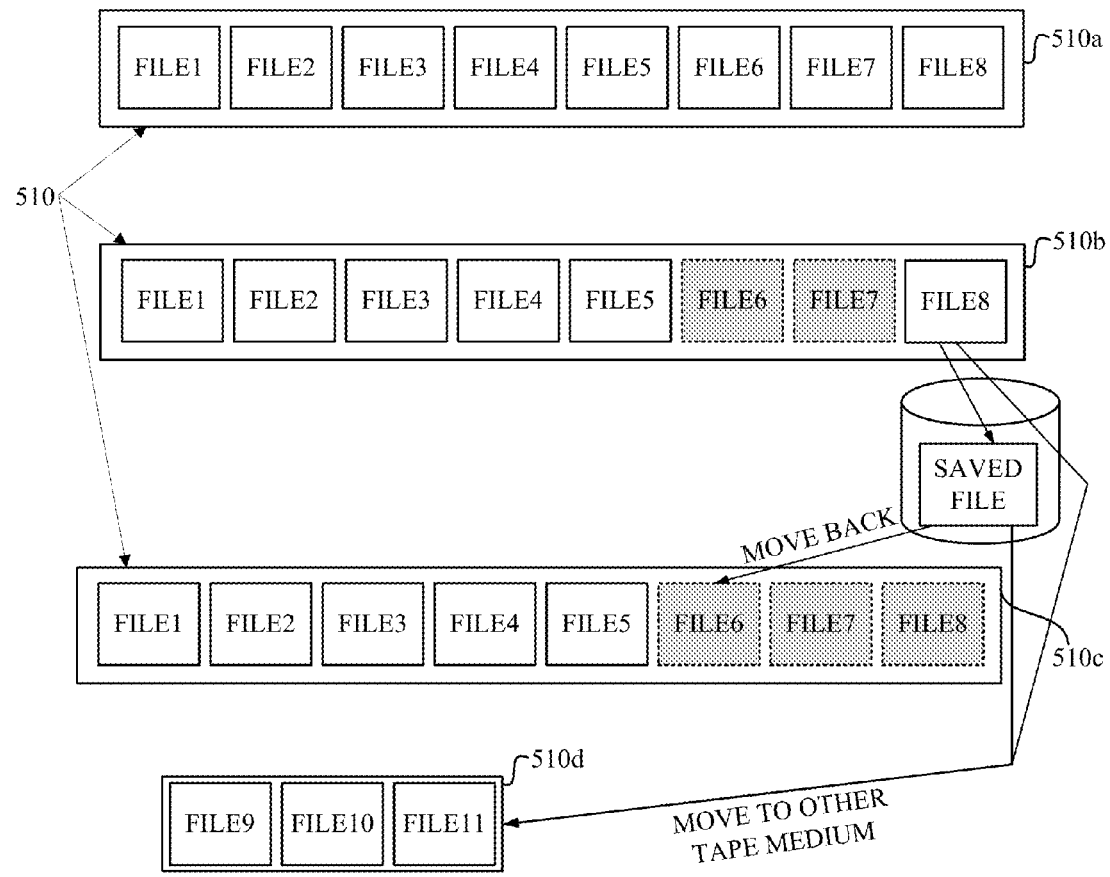

Referring to FIG. 5A, in various embodiments, several files around the tail end of the tape medium are overwritten if these files on the tape medium become inactive before the current migration process. In FIGS. 5A and 5B, recording space of the tape media 134 is depicted by a rectangular band 500a and rectangular band 500b, generally designated as bands 500. The left hand side of each of bands 500 may correspond to front side of the recording space whereas the right hand side of each of bands 500 may correspond to the rear side of the recording space. The file object is depicted by file 1 of band 500a and file 1 of band 500b, in the bands 500. The white box, file 1 of band 500b, represents an active object whereas a gray box, for example, the file generally designated as File 8 in band 500b of FIG. 5A represents an inactive object. In FIG. 5A, the upper band 500a represents recording space just after the previous migration process is completed. The lower band 500b represents the recording space just before the current migration process is started.

Referring to FIGS. 4B and 5A, the last three files (file 6, file 7 and file 8) are active at the time of the previous migration process (see the upper band 500a in FIG. 5A). However, these three files become inactive before the current migration process due to deletion of files from and/or update of files in the hierarchical storage system 100 after the previous migration process, for example (see the lower band 500b in FIG. 5A). In an embodiment, the nodes 112 set the EOD to the tape media 134 just after last active file (file 5) is written before the rearmost file that is determined to be inactive (file 6), at step S202. The space that is occupied by these inactive files, from a file just after the last active file to the file determined to be inactive (e.g. from file 6 to file 8), is overwritten when the migration to the tape media 134 starts at step S207 for the current migration process.

If the nodes 112 determines that the rearmost file is active in decision step S201 "NO" branch (FIG. 4B), the process branches to step S203. At step S203, the nodes 112 determine whether there is any inactive file near the rearmost file. If the nodes 112 determine that there is at least an inactive file near the rearmost file, in decision step S203 "YES" branch, the process branches to step S204. At step S204, the nodes 112 save the active rearmost file to the disk caches 122 or the memory device to make the file inactive. At step S205, the nodes 112 write the EOD on the tape media 134 just after the last active file, which is not the saved rearmost file. At step S206, the nodes 112 move the saved file in the disk caches 122, or the memory device, back to the tape media 134 and the process proceeds to step S207. At step S207, the nodes 112 start to migrate the files to the tape media 134, and ends at step S208.

Referring to FIG. 5B, several files on the tape media 134 are overwritten when the rearmost file on the tape medium is still active but the next files to the rearmost file on the tape medium become inactive before the current migration process. In FIG. 5B, the first band 510*a* represents recording space just after the previous migration process is completed. The second band 510*b* represents recording space just before the current migration process is started. The third band 510*c* represents recording space just after the rearmost file is saved and becomes inactive. Bands 510*a*, 510*b*, and 510*c* may be generally designated as bands 510.

As shown FIG. 5B, the last three files of band 510*a* (file 6, file 7 and file 8) are active at the time of the previous migration process. Some of these files (file 6 and file 7 in describing example) become inactive before the current migration process, represented in FIG. 5B as shaded file 6, and file 7. However, some of these files, for example, file 8, still remains as active at the time of the current migration process represented by band 510*b*.

Referring to FIGS. 4B and 5B, after saving the active rearmost files to the disk caches 122 or the memory device, the nodes 112 set the EOD to the tape medium just after the last active file, file 5 in band 510*b*, which is not the active rearmost file. The space occupied by these files including the rearmost file, file 8 of band 510*b*, is overwritten when the migration to the tape media 134 starts at step S207 for the current migration process. The saved rearmost file, saved file 514, which may be, in various embodiments, file 8, may be moved back to the current tape media 134 before starting the migration process, in band 510*c*. By repeating the above described saving and moving steps, the rear region occupied by inactive files between active files can be efficiently overwritten for reused.

In various embodiments, the range of rear region where the nodes 112 inspect, to determine whether there is any inactive data or not, can be limited using a predetermined threshold. The saving and the moving are performed merely if the time estimated for saving and/or moving an active file or active files does not exceeds the predetermined threshold.

Referring back to FIG. 4B, in decision step S203, if the nodes 112 determine that there is no inactive data near the rearmost file in decision step S203 "NO" branch, the process branches to step S207, directly. At step S207, the nodes 112 start to migrate the files to the tape media 134 without overwriting data around the end tail of the tape medium, and ends at step S208.

In an embodiment, the rearmost file saved into the disk caches 122 is moved back to the originating tape medium. In additional embodiments, the nodes 112 can move the rearmost file to other tape medium. The rearmost file may be saved into the disk caches 122, or memory device, and move to the other tape medium from the disk cache 122. Alternatively, the rearmost file may be moved directly from the originating tape medium to the other tape medium.

Referring back to FIG. 5B, in various embodiments, the rearmost file 514 is moved to other tape medium. In FIG. 5B, the fourth band 510*d* represents recording space of the other tape medium. As shown in FIG. 5B, the saved rearmost file 514 may be moved to a tape medium other than the current tape media 134 before starting the migration process in band 510*d*. The migration process overwriting inactive data around the end tail of the tape medium can be applicable to both modes of the migration process. In an embodiment, the migration process is performed in the first mode, in which a target file is moved from the shared disk array 120 to the tape media 134 of the tape library 130 and a stub is left on the shared disk array 120 in place of the target file. Thus, the file state of the migrated file becomes "migrated". In additional embodiments, the migration process is performed in the second mode, in which a target file is copied from the shared disk array 120 to the tape media 134 of the tape library 130 such that identical copies of the target file exist on the shared disk array 120 and the tape library 130. The file state of these migrated file becomes "pre-migrated".

Referring back to FIGS. 4A and 4B, in an embodiment of the invention, steps S101-S103, step S105, and steps S201-S207, may be performed every migration process. In various embodiments, the steps of determining and overwriting (steps from S201 to S206) can be omitted for at least first migration process. The steps of obtaining (step S102) and ordering (step S103) can be omitted if user does not plan to perform the migration process.

According to the migration function described in FIGS. 5A and 5B, the order of the files migrated to the tape library 130 is determined on the basis of the metadata information, such that the files expected to become inactive before next migration process are arranged in the rear region around the end of the tape media 134. The file that becomes inactive after the previous migration process would be overwritten by migrated data, and a space occupied by the inactive data can be reused during a next migration process. The inactive recording space around the tail end of the tape medium may be reduced efficiently, and may improve utilization of the tape medium.

Figure 6:
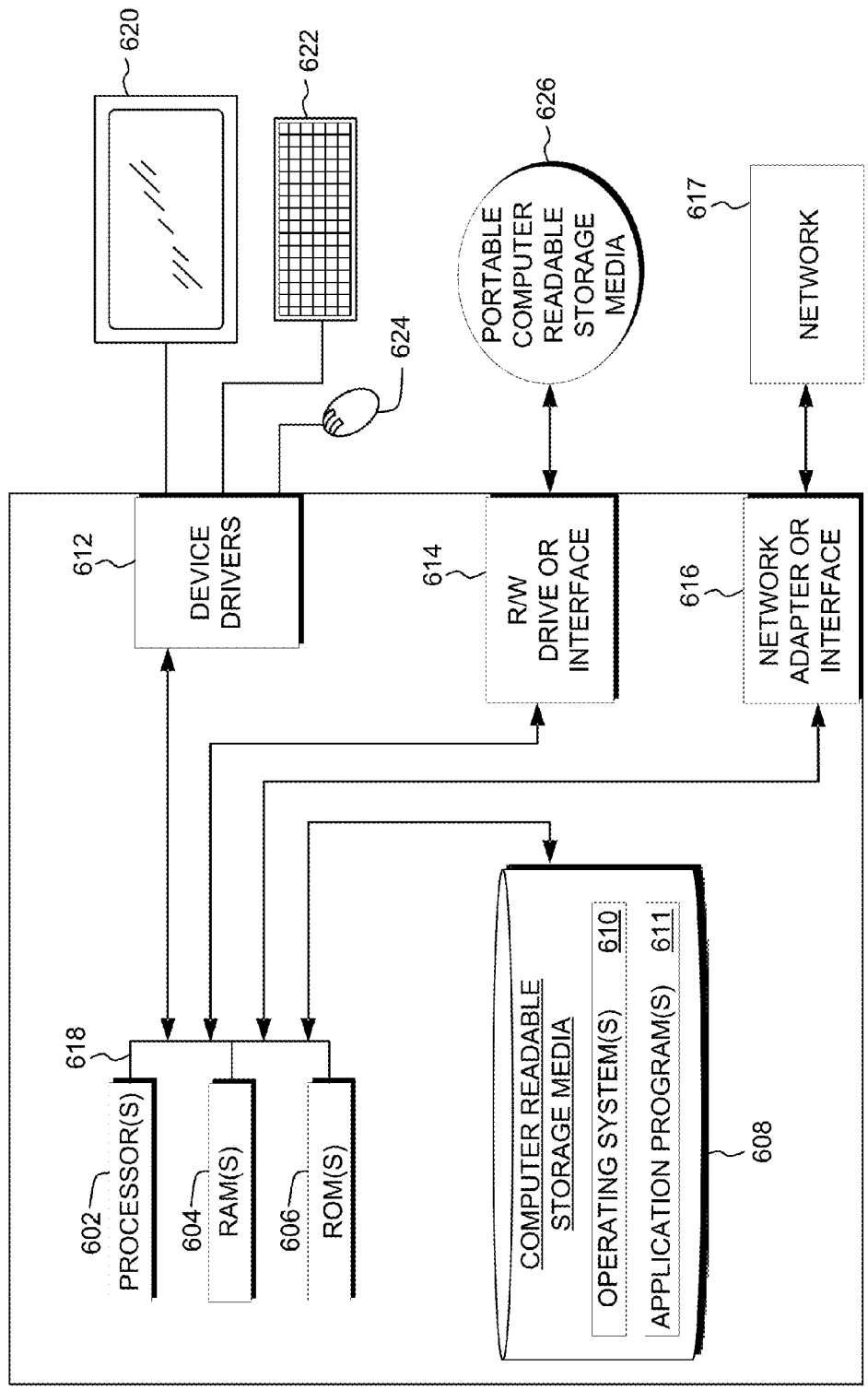
FIG. 6 depicts a block diagram of components of the server computer executing an application, in according to an embodiment of the present invention.

Referring to FIG. 6, FIG. 6 depicts a block diagram of components of the nodes 112, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

The nodes 112 may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The nodes 112 may also include a R/W drive or interface 614 to read from and write to one or more portable computer readable storage media 626. Application programs 611 on the nodes 112 may be stored on one or more of the portable computer readable storage media 626, read via the respective R/W drive or interface 614 and loaded into the respective computer readable storage media 608.

The nodes 112 may also include a network adapter or interface 616, such as a TCP/IP adapter card or wireless communication adapter (such as a 4G wireless communication adapter using OFDMA technology) for connection to a network 617. Application programs 611 on the nodes 112 may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

The nodes 112 may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

The present invention may be a computer system, a method, and/or a computer program product. The computer program product may include a computer readable storage medium (or media) having computer readable program instructions thereon for causing a processor to carry out aspects of the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer system for migrating data in a storage system by a computer, the storage system including a first storage and a second storage having a sequential access medium, the computer system comprising:
one or more computer processors;
one or more computer-readable storage media;
program instructions stored on the computer-readable storage media for execution by at least one of the one or more processors, the program instructions comprising:
in response to instructions to determine that the second storage comprises an index partition and a data partition, instructions to select a plurality of data to migrate from the first storage to the second storage, wherein selected files are in a resident state;
instructions to obtain metadata associated with one or more subsets of data of the plurality of data;
instructions to order the subsets of data based on the obtained metadata, the order of the subsets of data following an expectation of update value;
instructions to transfer the subsets of data to the second storage based on the order of the subsets of data based on a predetermined schedule;
in response to instructions to determine the plurality of data written in a rear region of the sequential access medium being inactive, instructions to overwrite the data determined as inactive on the sequential access medium by transferred data;
in response to instructions to determine that the one or more sets of data written in the rear region are inactive, instructions to set an end data to the sequential access medium after a last active data is written before the one or more sets of data are determined to be inactive;
instructions to delete the one or more sets of data determined to be inactive from the second storage;
instructions to initiate a transfer to the sequential access medium after the setting.

* * * * *